Dec. 8, 1931.  J. S. ABERCROMBIE  1,834,921
QUICK OPERATING BLOW-OUT PREVENTER
Filed July 1, 1927
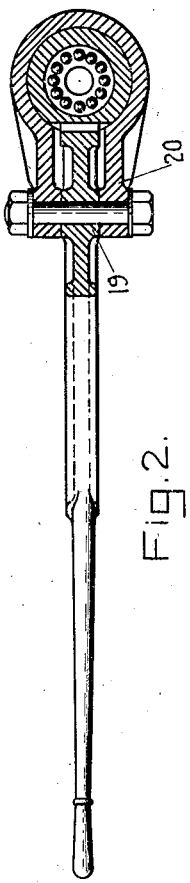
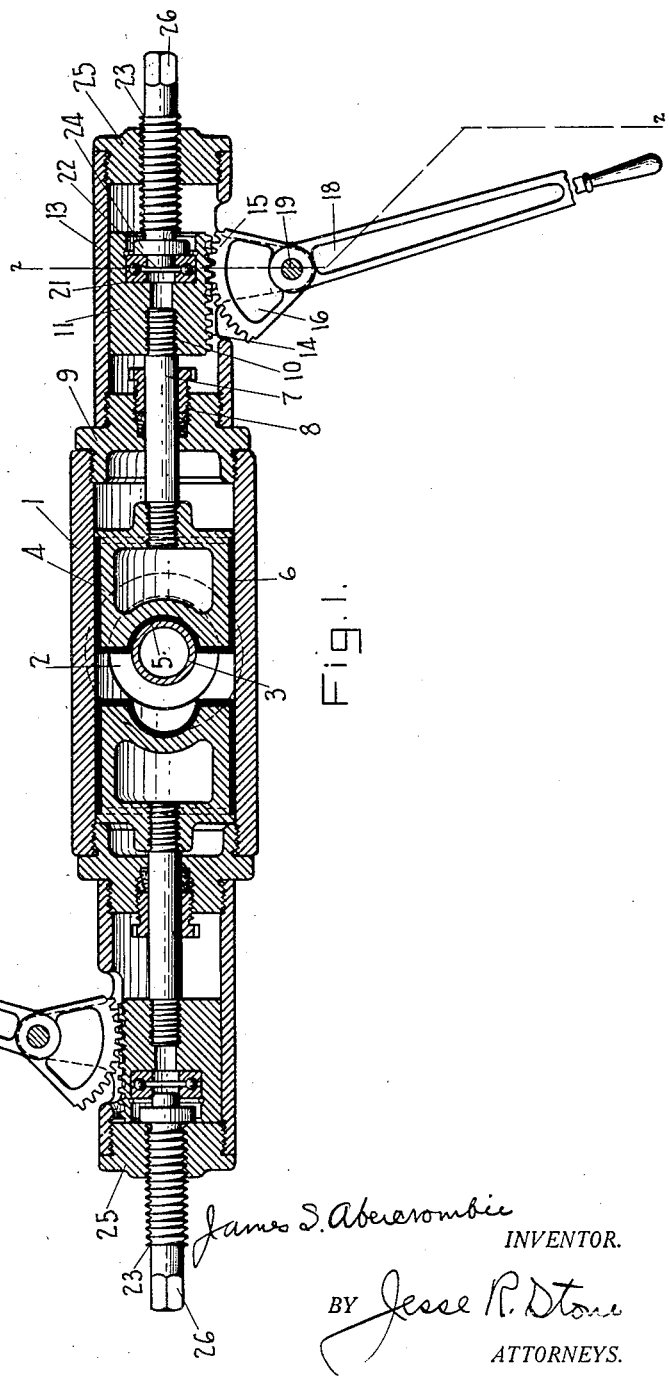
James S. Abercrombie
INVENTOR.
BY Jesse R. Stone
ATTORNEYS.

Patented Dec. 8, 1931

1,834,921

UNITED STATES PATENT OFFICE

JAMES S. ABERCROMBIE, OF HOUSTON, TEXAS

QUICK-OPERATING BLOW-OUT PREVENTER

Application filed July 1, 1927. Serial No. 202,889.

My invention relates to blow-out preventers to be employed in well drilling operations for the purpose of shutting off the space about the drill stem at the casing head and prevent the well from blowing out.

The invention is adapted for application to wells in which gas pressures are encountered and where the gas tends to blow from the well before preparations can be made for properly equipping the well for production.

It is an object of the invention to provide means for operating the cut-off means which may be worked with rapidity and speed so that the valves of the preventer may be closed without material delay.

It is an object to provide a rapid closing means for a blow-out preventer which is simple in construction and convenient to operate in case of emergency. The invention resides in the particular construction and arrangement of the parts connected with the operating means and will be more clearly understood from the description which follows.

Referring to the drawings herewith, Fig. 1 is a central horizontal section through a blow-out preventer employing my operating means thereon. Fig. 2 is a transverse section on the plane 2—2 of Fig. 1.

The particular blow-out preventer which I have shown equipped with my invention is that disclosed in the prior patent to myself and H. S. Cameron, Serial No. 1,569,247, granted January 12, 1926. It comprises a cylindrical housing 1, having a vertical passage 2 therethrough to receive the drill stem 3. On each side of the drill stem within the housing 1 is a piston valve 4, which is shaped to fit within the cylinder formed by the housing 1 and adapted to be advanced or withdrawn in said cylinder to form a contact with the drill stem 3. The forward sides of the piston valves are formed with semi-cylindrical recesses indicated at 5 to fit about the drill stem. When the two valves are advanced into close contact with each other they make a tight closure about the drill stem so as to prevent the escape of gas past the preventer.

The sides and forward faces of the piston valves have packing members 6 thereon, which enable the preventer to make a fluid tight fit about the drill stem to prevent the escape of gas.

The pistons are formed with operating stems 7 thereon, which extend axially outward through the housing and through a stuffing box 8 formed within a cap or plug 9 screwed within the end of the housing and tending to close the same against the passage of gas.

The outer end of the stem 7 is threaded at 10 for engagement within a block 11 slidable within a sleeve 13 screwed upon the outer end of the cap 9 and furnishing a guide for said block 11. Said block 11 is formed with lateral teeth 14 on one side, which are adapted for engagement with the teeth 15 upon a segment 16 formed at the forward end of a lever 18 pivoted at 19 upon a shaft extending through ears 20 upon the sleeve 13, as shown best in Fig. 2.

The block 11 has on its outer side a recess therein to receive a bearing race 21 fitted about the forward end 22 of a screw member 23. The forward end of said screw member is formed with a radial flange 24 bearing against the said race and adapted to exert a thrust upon the block 11 through the intervention of said bearing race. The screw member 23 is extended through a plug 25 screwed in the outer end of the sleeve 13, and has its outer end squared at 26 to receive wrench or crank, by means of which the screw may be rotated. It will be noted that the rotation of the screw member within the plug 25 will advance the same toward the plug 11 and serve to move it forwardly and hold it against being retracted while in use.

The valve members at each end are operated in the same manner and have, in fact, the same identical construction. When it becomes necessary to close the valves forming the preventer, the levers will be moved in a direction outwardly away from the drill stem so as to throw the piston toward the drill stem, as will be obvious from the drawings. After the valves have thus been closed the screw member 23 will be advanced through the rotation thereof until the head 24 thereon bears strongly against the bearing member 21. Pressure may thus be exerted on the valve to close it with great force and the screw member will hold it in that position.

When it is desired to again open the valve, the screw will first be withdrawn by unscrewing it to the position shown at the left of Fig. 1. The lever may then be operated by swinging the handle thereof inwardly toward the drill stem and throwing the piston back against the end of the screw, as shown.

It will be noted that the operation of the valve through means of the hand levers enables the valve to be closed quickly in case of emergency, and after the valve is closed further pressure may be exerted thereon through the screw members, as described, and the said screws will also serve to hold the valve closed until it is again desired to open. It will be possible then to operate the valve quickly by means of the levers so as to prevent a blowout and the screws will be supplemented by the action of the levers to retain the valve tightly in closed position.

The advantages of this construction will be apparent to those skilled in the art. What I claim as new and desire to protect by Letters Patent is:

1. In a blowout preventer, a cylindrical housing having a central transverse opening therethrough to receive a drill stem, piston valves in said housing shaped to engage and fit about said drill stem, cylindrical end extensions on said housing one side of which is slotted, cylindrical blocks having a substantial bearing in said extensions opposite to said slots, said blocks having teeth thereon adjacent said slots, stems on said blocks connected with said piston valves, racks supported on said extensions and engaging the teeth on said blocks whereby said blocks and valves may be moved, and means to retain said piston valves in closed position.

2. In a blowout preventer, a cylindrical housing having a central transverse opening therethrough to receive a drill stem, piston valves in said housing shaped to engage and fit about said drill stem, cylindrical end extensions on said housing one side of which is slotted, cylindrical blocks having a substantial bearing in said extensions opposite to said slots, said blocks having teeth thereon adjacent said slots, stems on said blocks connected with said piston valves, racks supported on said extensions and engaging the teeth on said blocks whereby said blocks and valves may be moved, and means to retain said piston valves in closed position, said means comprising a screw shaft, and antifriction means on said blocks whereby high pressures may be exerted to clamp said valves tightly about the drill stem.

In testimony whereof I hereunto affix my signature this 24th day of June, A. D. 1927.

JAMES S. ABERCROMBIE.